Patented Aug. 7, 1934

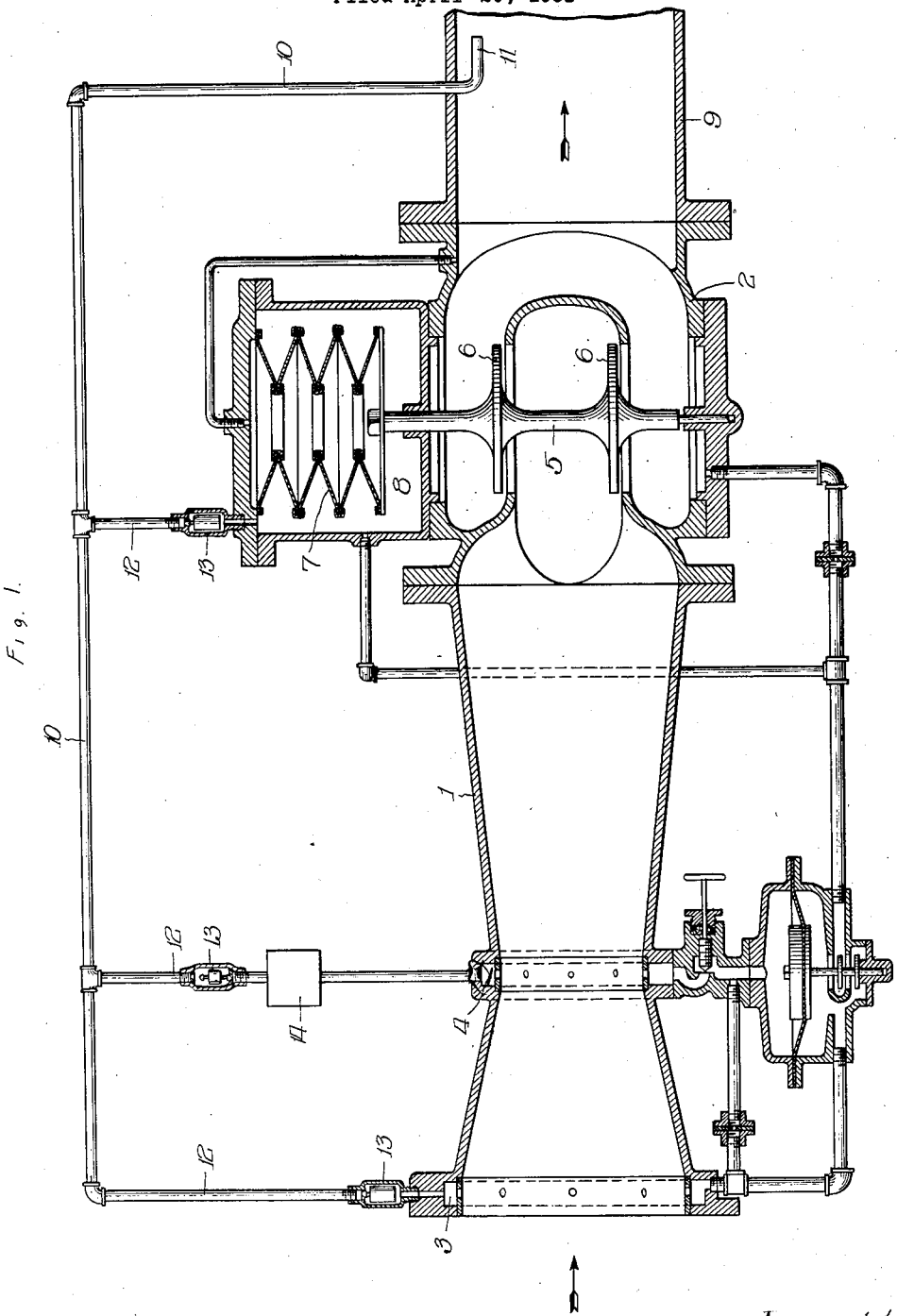

1,969,366

UNITED STATES PATENT OFFICE 1,969,366

FLUID FLOW CONTROLLER

Walter H. Green, Chicago, Ill., assignor to General Zeolite Co., Chicago, Ill., a corporation of Illinois Application April 20, 1931, Serial No. 531,428

5 Claims. (Cl. 137—152.5)

This invention has to do with fluid flow controllers and particularly with controllers of the kind used to control the flow of water from gravity filter beds of the type used in municipal filter plants and for other similar purposes and has for an object to provide an improvement therein whereby certain difficulties hitherto met with will be overcome.

In the operation of a filter of the gravity type the head available to cause the water to pass through the bed and associated discharge piping, is ordinarily that due to the difference in level between the water over the bed and the end of the discharge line, or if the end of the discharge line is submerged in the clear well as is commonly the case, then the difference between the water levels over the bed and in the clear well. While the level over the bed is usually fairly constant the level in the clear well varies considerably thus altering the head effective on the filter. Furthermore the resistance to the flow of water through the bed varies with the amount of sediment on the bed, increasing from a minimum when the bed is restored to service after being washed, to a maximum at the end of a run. The influence of these varying factors would cause the rate of flow to vary widely and at times it would be excessively high, if some control were not exercised. Experience has shown that for good results the rate of flow through a filter bed should be held uniform and that it should not exceed a certain amount per unit of filter area per unit of time.

To provide automatic means for maintaining the flow at a desired rate, various automatic devices known as rate of flow controllers have been developed. While these controllers vary widely in detail, yet they are alike in that they all comprise some means of metering or gauging the rate of flow, a regulating valve and a pressure responsive device by which variations in the rate of flow are effective to control the positioning of the regulating valve. In most devices of this kind, and in all that are now widely used, a Venturi tube is used to gauge the flow.

Experience has shown that it is not good practice to allow a filter bed to remain in operation after the loss of head through it, due to the accumulation of sediment thereon or to packing, amounts to more than about twelve feet, at which time it is cut out of service and washed. For this reason and in order to reduce pumping charges or to have more head available elsewhere, it is customary to design such filter plants so that the difference between the water level over the filter bed and the upper level in the clear well is ten or twelve feet.

It will be readily understood that with only so much head available it is important that there be no unnecessary loss of head but that the whole amount be available to cause flow through the bed, otherwise the bed will require more frequent washing with consequent waste of wash water and increased time out of service.

Experience has shown that practically all of the resistance to flow and consequent loss of head, caused by the depositing of the sediment removed from the water by the filter, occurs at the top surface of the filter bed. From this it follows, since the depth of water over the bed is not great, that when the filter is approaching the end of its run, and the resistance approaches the limiting point, that the pressure in the filter bed at some distance below the surface and in the outlet piping, is below atmospheric. Due to this there tends to be a separation of air from the water as it passes down through the bed, particularly with waters, such as surface waters, that are saturated with air at atmospheric pressure. Some of this separated air remains in the filter bed until forced out by the upward flow of water during the next backwash, but some of it is carried along with the water and tends to accumulate where there are high places or pockets.

One of the difficulties hitherto experienced with controllers in this service has been due to the accumulation of air therein, as in diaphragm chambers, in the annular rings at the full section and throat, etc. with the result that the operation of the controllers is interfered with so that they become inaccurate or ineffective. Also at times air accumulates in the pipe line anterior the controller to an extent such as to restrict the flow. It is not practical to install air relief valves, such as are commonly used on pipe lines, for while these are effective to let air out and retain the water when the pressure in the line is above atmospheric, they tend to open and admit air when the pressure is below atmospheric, as it is at times under the condition recited.

In many filter plants it has been found necessary to inspect each controller just after the bed with which it is associated has been washed, when the pressure therein is above atmospheric, and to manually open cocks and valves to permit the pocketed air to escape. While this practice is beneficial it is not wholly effective to prevent trouble as air will again accumulate during the run.

My invention has for one object to provide a method and means whereby the controller and the effluent pipe anterior thereto, are automatically vented even when the pressure therein is below atmospheric.

Another object of my invention is to provide a controller having venting means cooperating with the functioning of the controller in such a manner that air is vented even when the pressure in the system is below atmospheric.

It is of course necessary to vent the air to some point where the pressure is below that existing at the point of accumulation. For this purpose I take advantage of the construction of the controller itself and its mode of operation. These controllers are placed in the effluent line from the filter with the Venturi tube anterior the regulating valve. Since the regulating valve inevitably offers some resistance to the flow even when wide open and of course more resistance when partially closed, as it must be except at the very end of the run, in order to exercise any regulating action, it is apparent that the pressure on the discharge side of the valve will be lower than on the upstream side.

I utilize this to vent the air from places on the upstream side by providing a suitable connection whereby the controller and the vent pipe cooperate to relieve the former of air to a point below the valve. In the drawing herewith a single vent line is shown, this being connected to several points above the valve. It will be understood however, that if desired there may be a separate line from each point it is desired to vent or that two or more may be joined. In the drawing an air relief valve of a common type is shown at each point to be vented. While of advantage in some cases these relief valves may be omitted and a continual small stream of water permitted to flow at all times to carry along the air.

In general it will be found best to provide a separate connection to vent the throat ring of the venturi. Due to the manner in which a Venturi tube functions the pressure at this point will be less than at any other point above the valve. Consequently if interconnected there might tend to be a flow from other points to the throat bringing air there instead of providing relief at the throat. It is true also that at times, as toward the very end of a run, the pressure in the throat ring may be lower than on the discharge side of the valve. This will prevent the flow of air from the throat ring to the discharge side during the time such a condition exists but it is for a relatively short period and the advantages of venting are secured over most of the run. Furthermore, if desired a chamber of suitable size may be provided above the throat ring into which air may rise and accumulate until it shall be vented by the change of pressure during subsequent operation.

It will be understood that the venting pipes will be relatively small so that undue flows will not exist through them, or they may be provided with restrictions. They should not however be too small as otherwise there may be too much tendency for the bubbles of air to lodge in them and not escape. Tubing of one-eighth to one-quarter inch internal diameter is generally suitable.

The end of the vent pipe that projects within the main below the valve may advantageously be bent and turned downstream as shown as thereby a gain from the Pitot tube effect is received.

In order that my invention may be more readily understood I will now describe one embodiment thereof. For this purpose I have chosen to utilize a controller of the type shown in pending application Serial No. 529,047.

Fig. 1 shows a cross sectional view of a controller and the discharge line leading therefrom, embodying my invention.

In this figure is shown a controller comprising the Venturi tube 1 and regulating valve 2. The Venturi tube has the upstream ring 3 and throat ring 4. The valve stem 5 with the discs 6 is carried by the bellows 7 located within the chamber 8. The numeral 9 designates the conduit leading from the discharge side of the valve 2 to the reservoir or other point of discharge. Pipe 10, terminating within conduit 9 in the downwardly extending section 11, is joined by branches 12 with the various points in the controller to be vented. In each of the branches 12 is shown an air relief valve 13 of familiar type.

These valves 13 may advantageously be provided with seats below the float, similar to those shown above, whereby they will act as check valves to prevent reverse flow.

In the line 12 leading to the throat section 4 is shown a chamber 14 which may be either above or below the associated valve 13.

In the operation of the plant with which the controller is associated, water will be flowing through in the direction indicated and air liberated from the water or entering through leaky joints at times when pressure is below atmospheric will be carried along by the flow of water and some of it will enter one or the other ring chamber or collect at some other point. While heretofore there has been no way to vent such air except manually, a controller embodying my invention will be automatically and continuously vented as described and as is apparent from the drawing.

It is understood that my invention is not restricted to the particular form of controller used herein for purposes of illustration but may be utilized with various forms. Also the vent piping and connections need not be as shown but may be varied to suit any particular form of controller or set of operating conditions. Adaptation and changes will suggest themselves to those practiced in this art and are contemplated by me whereby the advantages of my improved method of venting may be secured in different ways. I therefore do not limit my invention or its application except as made necessary by the prior art short of the broadest permissible interpretation of the appended claims.

What I claim is:

1. The method of venting a rate of flow controller forming part of a fluid flow system which comprises establishing a by-pass flow of mingled liquid and air from a point of higher pressure in the controller to a point of lower pressure within the system.

2. A fluid flow system comprising a rate of flow controller, said controller comprising pressure differential creating means and a regulating valve, said pressure differential controlling the positioning of said valve, and means for preventing accumulation of air in the system anterior said valve comprising a by-pass line leading from a point of functional pressure in said first named means to a point below said valve.

3. A fluid flow controller comprising in combination means for deriving a differential pressure functional to the flow, a diaphragm to which said differential pressure is applied, a regulating valve on the outlet side of said differential deriving means, the positioning of said valve being governed by said differential acting on said diaphragm, and a gas vent conduit leading from a point on said means to a point in the outlet side of said valve.

4. A fluid flow controller comprising a differential pressure producing device, a regulating valve on the discharge side thereof, means to actuate said valve from the differential so as to maintain the flow constant, and a vent to discharge air from a point on the said device to a point on the outlet side of said valve.

5. A fluid flow controller comprising a Venturi tube, a regulating valve on the outlet end thereof, and a gas vent pipe leading from one of the piezometer rings of said tube to a point on the outlet side of said valve.

WALTER H. GREEN.